T. SHUMAN.
WASH-BOILER.
No. 172,662. Patented Jan. 25, 1876.
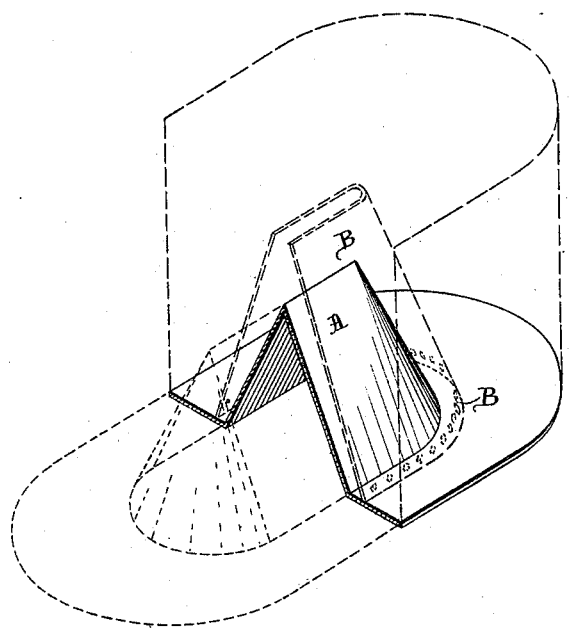
WITNESSES:
Edw. W. Dunn
M. Gardner
Thomas Shuman.
INVENTOR.
J. McC. Perkins
ATTORNEY.

UNITED STATES PATENT OFFICE.

THOMAS SHUMAN, OF CORNING, IOWA.

IMPROVEMENT IN WASH-BOILERS.

Specification forming part of Letters Patent No. 172,662, dated January 25, 1876; application filed October 30, 1873.

*To all whom it may concern:*

Be it known that I, THOMAS SHUMAN, of Corning, in the county of Adams and State of Iowa, have invented certain new and useful Improvements in Wash-Boilers; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

The object of my invention is to economize both time, labor, and fuel required for boiling and washing clothes.

My invention consists in forming a hot-air chamber in the bottom of the boiler, and is used in combination with my boiler attachment, for which a patent was issued to me dated April 1, 1873, and numbered 137,492.

A shows the hot-air chamber in the bottom of the boiler. This chamber may be molded, in the usual way, by a press and die, or it may be made of separate pieces and then joined together. The size and form of the chamber should conform to that of my patented boiler attachment, as shown in the drawing. The chamber, as well as the attachment, is of conoidal form, extending lengthwise of the boiler.

I make no claim to a chamber simply in the bottom of a boiler or other heating-vessel, without regard to its purpose, form, or shape. Air-chambers in the bottom of heating-vessels, I am aware, are not new.

Having now fully described my invention, what I claim, and desire to secure by Letters Patent, is—

1. In a wash-boiler, a hot-air chamber in its bottom, of an oblong and conoidal form, and adapted to be used with a boiler attachment, substantially as shown and described, and for the purposes set forth.

2. The combination of the chamber in the bottom of a boiler or other heating-vessel with a movable attachment, perforated at its bottom, substantially as described, and for the purposes set forth.

THOMAS SHUMAN.

Witnesses:
 WILLIAM O. MITCHELL,
 I. P. GAGE.